United States Patent [19]

Maki

[11] Patent Number: 5,653,350
[45] Date of Patent: Aug. 5, 1997

[54] GRAPPLE CARRIAGE

[75] Inventor: William Maki, Pierce, Id.

[73] Assignee: Maki Manufacturing, Inc., Pierce, Id.

[21] Appl. No.: 660,848

[22] Filed: Jun. 10, 1996

[51] Int. Cl.$^6$ ................................................. B66C 21/00
[52] U.S. Cl. .................... 212/84; 212/197; 212/313; 212/317
[58] Field of Search ........................... 212/313, 317, 212/318, 326, 327, 83, 84, 85, 332, 333, 334, 335, 342, 197; 294/907

[56] References Cited

U.S. PATENT DOCUMENTS

| | | | |
|---|---|---|---|
| 1,931,700 | 10/1933 | Murphy et al. | 212/342 |
| 3,463,329 | 8/1969 | Gartner | 212/327 |
| 3,540,770 | 11/1970 | Mitchell | 294/111 |
| 3,647,255 | 3/1972 | Hale et al. | 294/111 |
| 3,651,952 | 3/1972 | Mitchell | 212/84 |
| 3,695,672 | 10/1972 | Mitchell | 294/112 |
| 4,449,634 | 5/1984 | Buzzichelli et al. | 212/317 |
| 4,515,281 | 5/1985 | Maki | 212/76 |
| 5,088,610 | 2/1992 | Garnier | 212/317 |

FOREIGN PATENT DOCUMENTS

| | | | |
|---|---|---|---|
| 328463 | 10/1919 | Germany | 212/317 |
| 2616253 | 11/1976 | Germany | 212/334 |

*Primary Examiner*—Thomas J. Brahan
*Attorney, Agent, or Firm*—Seed and Berry LLP

[57] ABSTRACT

A remote-controlled grapple carriage picks up and transports logs along a skyline cable. The grapple carriage is designed to enable logs positioned laterally with respect to the skyline cable without any assistance from a logger at the logs. The grapple carriage includes a motor carriage rotatably coupled to a skyline coupler slidably coupled to the skyline cable. In addition, the grapple carriage includes a boom pivotally coupled at a proximal end to the motor carriage and coupled at a distal end to a grapple. The grapple is rotatably and pivotally coupled to the boom in a manner that enables the grapple to pick up and transport logs to a landing. The various pivotal and/or rotatable couplings of the elements of the grapple carriage enable the grapple to reach logs positioned laterally of the skyline cable in a safe and efficient manner.

23 Claims, 4 Drawing Sheets

GRAPPLE CARRIAGE

TECHNICAL FIELD

The present invention relates to logging equipment and more particularly, to remote controlled skyline grapple carriages.

BACKGROUND OF THE INVENTION

While a traditional concern of any logging operation is the efficient transportation of felled timber from a forest to processing plants, modern logging planners are also concerned with minimizing safety hazards and environmental damage resulting from such operations. Thus, while clear-cutting timber may be the most "efficient" way to log a forest, logging planners may opt to selectively harvest timber because of environmental or timber management concerns.

It is important, therefore, that modern logging equipment be designed with the broadened concerns of logging planners in mind. Ideally, logging equipment will be adaptable for use in either clear-cutting or selective harvesting situations. Additionally, it is desirable to use logging equipment which will minimize the disruption of the soil in the area being logged. Such disruption can often result in excessive soil erosion, which will not only be detrimental to the forest land but can adversely impact aquatic life forms in nearby streams.

After timber is harvested, the resulting logs are transported to a landing. A landing is a generally level area, situated near a logging road, at which logs are loaded on trucks for hauling to processing plants. The act or process of conveying logs to a landing is known as "yarding." When timber is harvested on grades of less than 25–35%, tractors or other heavy equipment, such as skidders, may be used for yarding. Such equipment is generally efficient only at haul distances below 1,000 feet and works best in clear-cutting operations. When harvesting steeper slopes or hauling over longer distances, some type of cable yarding system is often employed.

One such system is a prior art skyline system 10 shown in FIG. 1. As is typical, the skyline system 10 includes a first portable tower 12 from which a skyline cable 14 extends to a second, typically shorter, portable tower 16. A skyline carriage 18 with grooved wheels 20 rides on the skyline cable 14 to carry logs to a landing positioned near the second portable tower. A second cable, known as a mainline cable 22, extends from the first portable tower 12 to the skyline carriage 18. Also attached to the skyline carriage 18 is a grapple cable 24 that extends downward from the motor carriage for attachment to the logs such as by grapple hooks 25.

The first portable tower 12 includes a first winch 26 to which the skyline cable 14 is connected. The first winch 26 pays out the skyline cable 14 to lower the skyline carriage 18 and reels in the skyline cable to raise the motor carriage. The first portable tower 12 also includes a second winch 28 to which the mainline cable 22 is connected. The second winch 28 reels in the mainline cable 22 to pull the skyline carriage 18 toward the first portable tower 12 and pays out the mainline cable to allow the motor carriage to travel toward the second portable tower 16 by gravity.

An important characteristic of a skyline system, such as the skyline system 10 shown in FIG. 1, is its lateral reach or yarding width. In the skyline system 10, logs positioned laterally away from the skyline cable are accessed by a logger pulling the grapple cable 24 laterally to the logs with the skyline cable 14 payed out to slacken the cable as necessary to reach the logs. After the logger attaches the grapple cable 24 to the logs, the skyline cable 14 is reeled in to cause the logs to swing to a position underneath the skyline carriage 18. The logs are then carried to the landing by the skyline carriage. Such a system of manually pulling the grapple cable laterally of the skyline cable 14, attaching the grapple cable to the logs, and allowing the logs to swing underneath the skyline cable poses many dangers to the loggers. In addition, such a procedure is time consuming, and thus, limits the speed of the logging operation.

SUMMARY OF THE INVENTION

The invention is directed to a grapple carriage for picking up and transporting logs along a skyline cable. The grapple carriage is designed to pick up logs positioned directly underneath or to either side of the skyline cable without any assistance from a logger at the logs. The grapple carriage includes a skyline coupler coupled to the skyline cable. In a preferred embodiment, the grapple carriage includes a motor carriage rotatably coupled to the skyline coupler. In addition, the grapple carriage includes a grapple coupled to a first end of the motor carriage in a manner that positions the grapple laterally of the skyline cable in order to grasp logs positioned laterally of the skyline cable. Rotatably coupling the motor carriage to the skyline coupler enables the grapple coupled to the motor carriage to reach logs positioned to either side of the skyline cable as well as directly underneath the skyline cable.

The grapple carriage preferably includes a boom having a proximal end coupled to the motor carriage and a distal end coupled to the grapple. The boom preferably is pivotally coupled to the motor carriage such that the boom distal end and grapple can be pivoted downward to reach the logs on the ground and upward to lift the logs. In one embodiment, the boom is extendible in that the boom includes first and second arm members axially aligned with respect to each other such that the first arm member telescopically extends into and out of the second arm member. When such an extendible boom is employed, then the grapple carriage preferably includes an extendible counterweight that extends outwardly from the motor carriage in a direction opposite to the extension of the boom in order to counterbalance the boom.

In the preferred embodiment, the grapple includes a pressure-sensitive mouth structured to exert constant pressure on the logs. To provide pressure sensitivity, the grapple carriage preferably includes a pressure-sensitive grapple controller that is structured to sense the pressure exerted by the grapple mouth on logs. In response to sensing a reduction in the pressure exerted by the grapple mouth, the grapple controller automatically increases the pressure exerted by the grapple mouth.

DETAILED DESCRIPTION OF THE INVENTION

Figure 1:
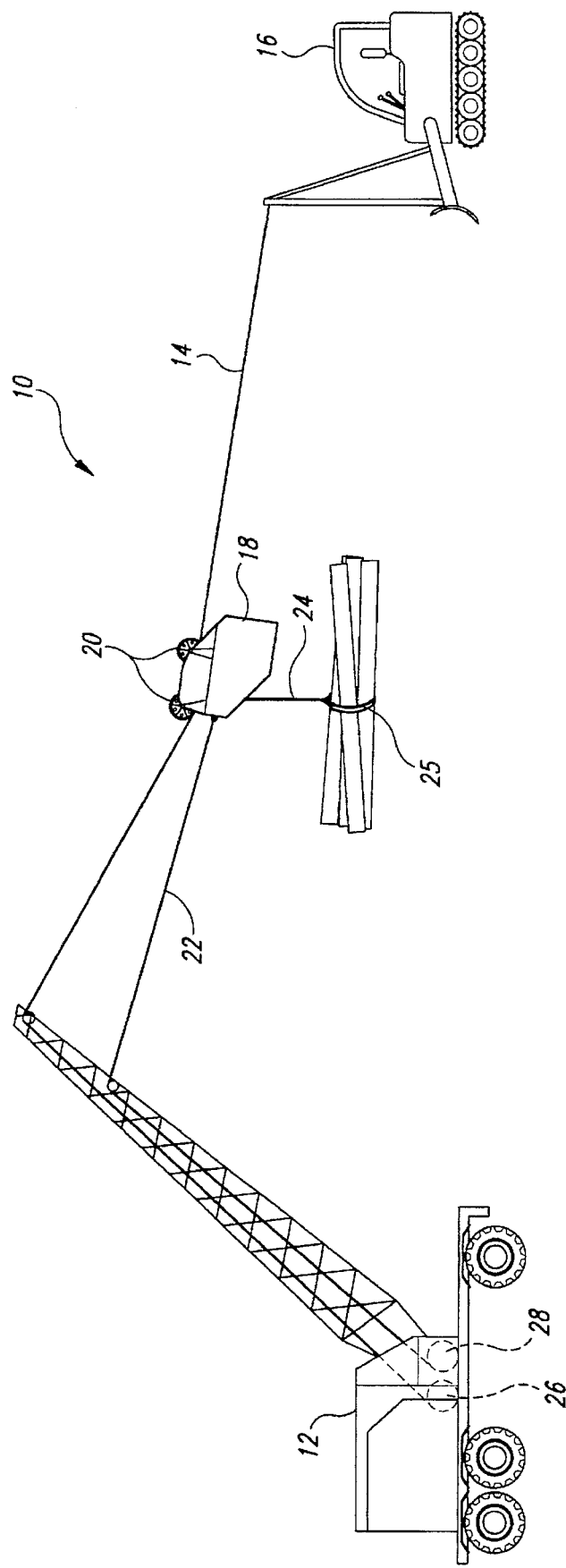
FIG. 1 is a side elevational view of a prior art logging skyline system.
Figure 2:
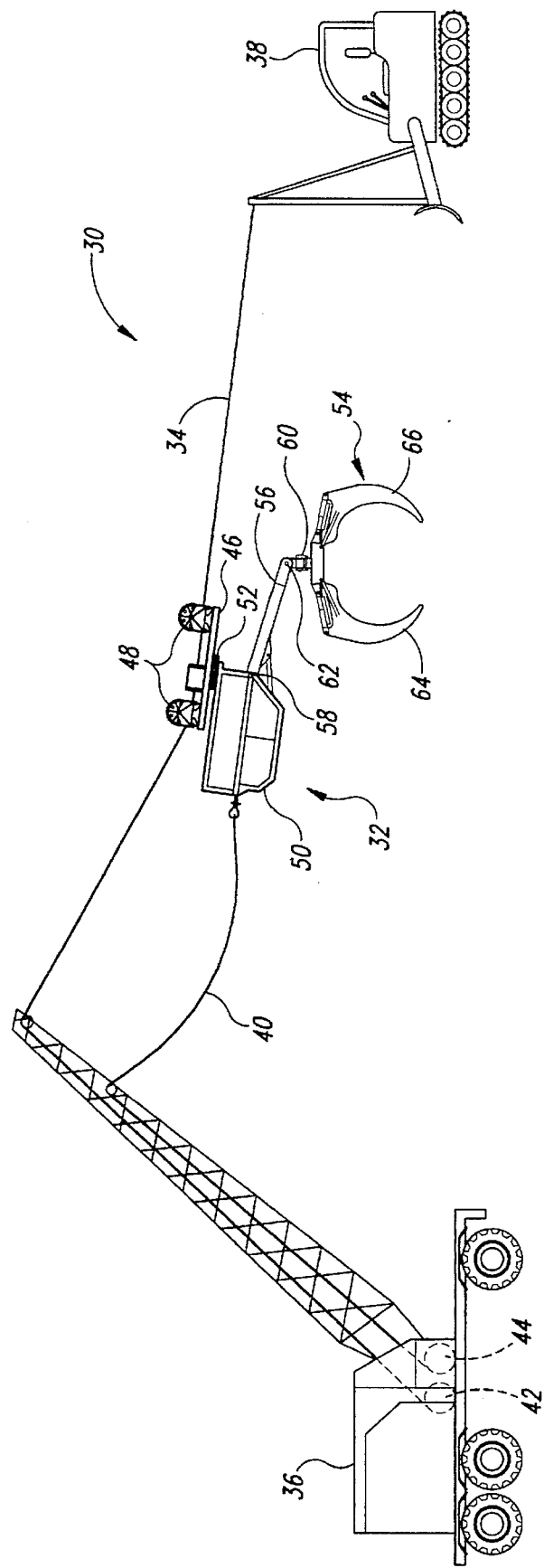
FIG. 2 is a side elevational view of a logging skyline system according to the present invention.

A skyline system 30 according to the present invention is shown in FIG. 2. The skyline system 30 includes a grapple carriage 32 suspended on a skyline cable 34 extending between a first portable tower 36 and a second portable tower 38. A mainline cable 40 extends from the first portable tower 36 to the grapple carriage 32 in order to control the position of the grapple carriage along the skyline cable 34. The first portable tower 36 includes a first winch 42 connected to the skyline cable 34 and a second winch 44 connected to the mainline cable 40 as discussed above with respect to FIG. 1. It will be appreciated that other types and arrangements of towers supporting the skyline cable 34 can be employed without detracting from the invention.

The grapple carriage 32 differs from prior art skyline carriages in that the grapple carriage of the present invention can pick up and transport logs without any assistance from a logger on the ground at the logs. Moreover, the grapple carriage 32 is structured to be highly maneuverable in order to pick up logs located to either side of the skyline cable 34. Accordingly, the grapple carriage 32 enables logs to be picked up and transported faster and more safely than is possible with prior art skyline systems.

The grapple carriage 32 includes a skyline coupler 46 movably coupled to the skyline cable 34. The skyline coupler 46 includes a pair of grooved wheels 48 that roll on the skyline cable 34 to enable the grapple carriage 32 to travel along the skyline cable. When the second winch 44 of the first portable tower 36 reels in the mainline cable 40, the grapple carriage 32 is pulled toward the first portable tower on the grooved wheels 48 along the skyline cable 34. When the second winch 44 pays out the mainline cable 40, the grooved wheels 48 of the grapple carriage 32 enable gravity to pull the grapple carriage along the skyline cable 34 toward the second portable tower 38.

In contrast to prior art skyline carriages, such as the skyline carriage 18 shown in FIG. 1, the grapple carriage 32 includes a motor carriage 50 that is rotatably coupled to the skyline coupler 46 via a rotation joint 52 for rotation in a generally horizontal plane. The rotation joint 52 is structured to allow 360 degrees of rotation of the motor carriage 50 relative to the skyline coupler 46, but less rotation would be sufficient to enable the grapple carriage 32 to reach logs located to either side of the skyline cable 34. Preferably the grapple carriage 32, including the rotation joint 52, is hydraulically powered and remote controlled such that the motor carriage 50 can be conveniently rotated with respect to the skyline coupler 46 from a location remote from the logs to be handled and without a logger at the logs. Such remote control is well within the skill in the art and can be accomplished by a user-operated radio controller that transmits radio signals to a transceiver coupled to the motor carriage. Such a transceiver can be coupled to control a hydraulic pump as discussed in more detail below with respect to FIG. 4.

In the preferred embodiment, the grapple carriage 32 includes a grapple 54 coupled to the motor carriage 50 by a boom 56. A proximal end of the boom 56 is pivotally coupled to the motor carriage 50 via a pivot pin 58 extending through the boom and motor carriage. The pivotal connection of the boom 56 to the motor carriage 50 enables the boom and grapple 54 to pivot upward and downward in a generally vertical plane with respect to the motor carriage. The rotational coupling of the motor carriage 50 to the skyline coupler 46 combined with the pivotal connection of the boom 56 to the motor carriage enables the grapple 54 to pick up logs positioned on either side of the skyline cable 34, in addition to logs located directly below the skyline cable.

The grapple 54 is coupled to the boom 56 by a grapple joint 60. Preferably, the grapple joint 60 is a universal joint that allows the grapple to pivot and rotate with respect to the boom 56. That is, the grapple 54 pivots upward and downward in a generally vertical plane about a generally horizontal pivot pin 62 extending through the boom 56. In addition, the grapple 54 rotates in a generally horizontal plane about a generally vertical pivot pin (not shown) extending through the grapple joint 60. As shown in FIG. 2, the grapple 54 is in the form of a mouth having first and second jaws 64, 66 structured to close around logs and open to release the logs after the logs are transported by the grapple carriage 32 to a landing.

The motor carriage 32 preferably is coupled of-center to the skyline coupler 46 by the rotation joint 52. That is, the motor carriage 32 has a center of gravity on a vertical plane that is displaced in a first direction (leftward in FIG. 2) from the rotation joint 52. The boom 56 extends from the motor carriage 50 in a second direction (rightward in FIG. 2) opposite to the first direction with respect to the rotation joint 52. As a result, the motor carriage 32 counterbalances the boom 56 and the grapple 54 about a vertical plane substantially through the rotation joint 52 in order to limit the torque exerted on the rotation joint 52 by the boom 56, grapple 54, and logs picked up by the grapple.

Figure 3:
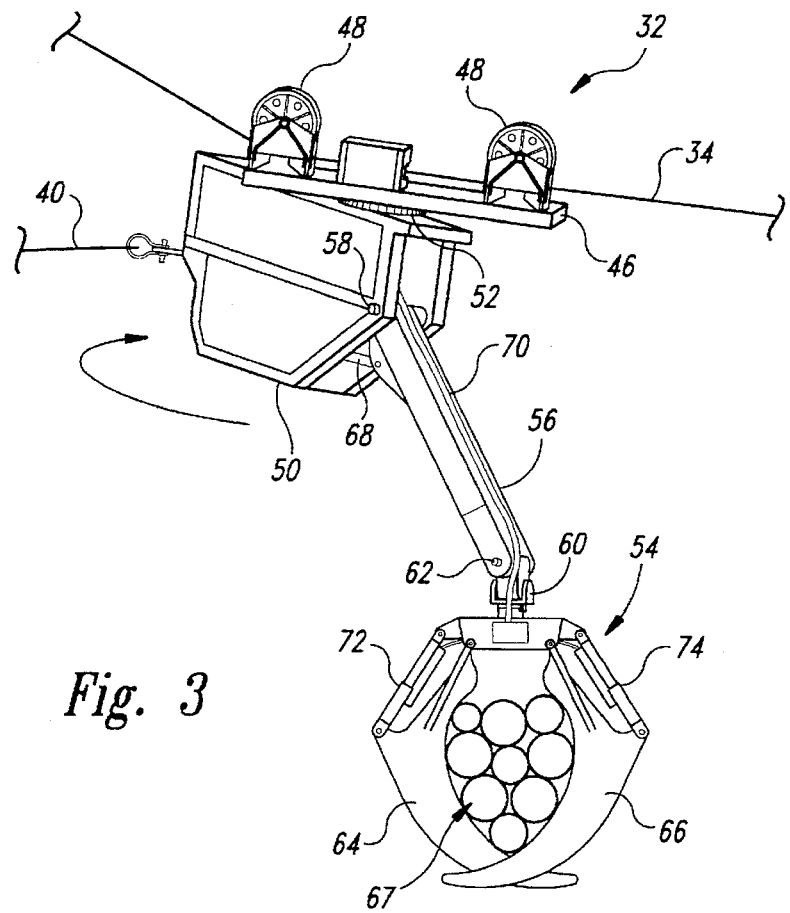
FIG. 3 is an enlarged, isometric view of a grapple carriage used in the skyline system of FIG. 2.

An isometric view of the grapple carriage 32 in use is shown in FIG. 3. The motor carriage 50 has been rotated with respect to the skyline coupler 46 when compared to FIG. 2 to reach logs located laterally away from the skyline cable 34. In addition, the boom 56 has been pivoted downward with respect to the motor carriage 50 and the grapple 54 has been pivoted and rotated with respect to the boom. The jaws 64, 66 of the grapple 54 are shown closed on a bundle of logs 67 in order to transport the logs to the landing.

In the preferred embodiment, the grapple carriage 32 includes a hydraulic pump 78 (see FIG. 4) with control valves positioned within the motor carriage 50 in order to move the grapple 54 as desired. The hydraulic pump 78 is connected via a hydraulic line 46 (see FIG. 4) to a single action boom hydraulic cylinder 68 connected between the motor carriage 50 and the boom 56. The hydraulic pump 78 provides pressurized hydraulic fluid to the boom hydraulic cylinder 68 in order to pivot the boom 56 upward on the pivot pin 58. The hydraulic fluid is returned to the hydraulic pump in order to allow gravity to force the boom 56 to pivot downward on the pivot pin 58.

In addition, hydraulic lines 70 connect the hydraulic pump 78 to the grapple 54. The hydraulic lines 70 are coupled to first and second grapple hydraulic cylinders 72, 74 which cause the jaws 64, 66 of the grapple to open or close as desired. In addition, the hydraulic lines 70 are coupled to a hydraulic motor (not shown) on the grapple joint 60 in a manner that enables the pivoting and rotation of the grapple 54 with respect to the boom 56. Preferably, the hydraulic pump 78 is remote controlled in order to allow a user to safely maneuver the grapple 54 as needed to pick up and transport the logs.

Figure 4:
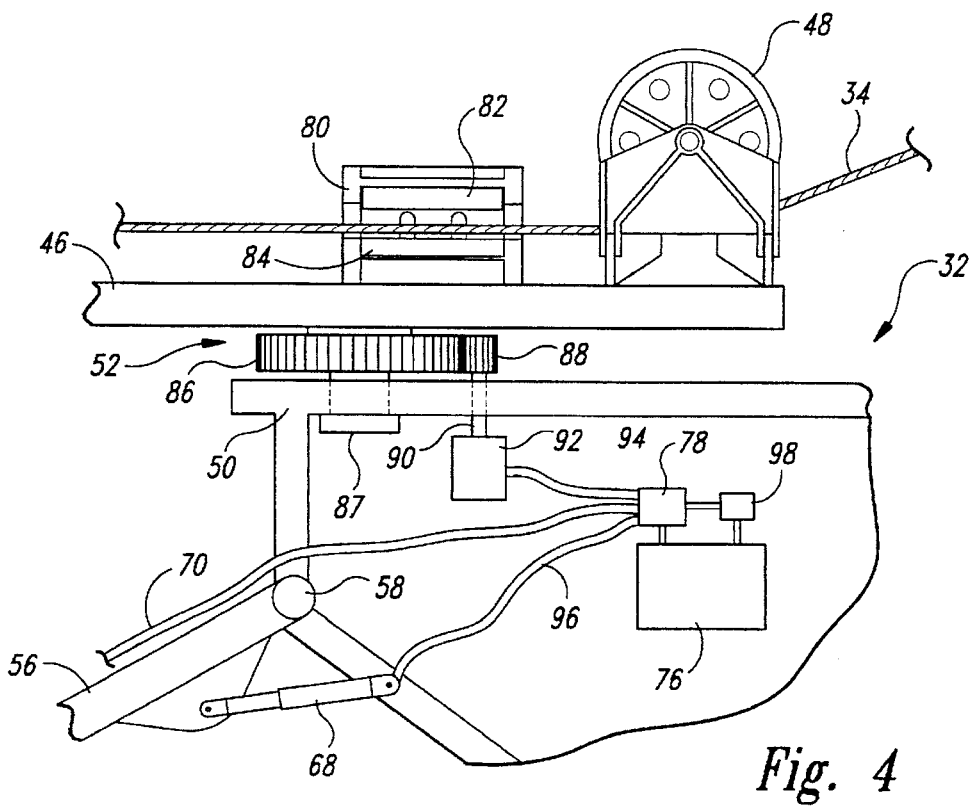
FIG. 4 is an enlarged, side elevational view of a skyline coupler and a motor carriage of the grapple carriage of FIG. 3.

Shown in FIG. 4 is a partial cutaway view of the grapple carriage 32. The grapple carriage 32 includes an internal combustion engine 76 that powers the hydraulic pump 78. In one embodiment, the engine 76 is a 40 horsepower, 2 cylinder diesel engine model 2M40LZ, manufactured by Hatz Manufacturing Company. In addition, the hydraulic pump 78 is a medium duty, load sensing piston pump manufactured by Eaton Corporation. It will be appreciated that other well known engines and hydraulic pumps can be employed within the broad concept of the invention. Moreover, plural hydraulic pumps can be employed as needed to power the various hydraulically powered systems of the grapple carriage 32 of the present invention.

The skyline coupler 46 of the grapple carriage 32 includes a brake 80 that selectively stops the skyline coupler 46 on the skyline cable 34. The brake 80 includes a hydraulically activated brake pad 82 that clamps the skyline cable 34 to a braking surface 84 in order to prevent the skyline coupler 46 and grapple carriage 32 from moving along the skyline cable. The brake pad 82 is hydraulically connected to the hydraulic pump 78 in order to firmly clamp the skyline cable 34 to hold the grapple carriage 32 in place on the skyline cable. The brake pad 82 is released from the skyline cable 34 by removal of hydraulic pressure to the brake pad to allow the grapple carriage 32 to move along the skyline cable as desired.

The rotation joint 52 enables the motor carriage 50 to rotate with respect to the skyline coupler 46. The rotation joint 52 includes a large gear 86 rigidly attached to the skyline coupler 46 and rotatably coupled to the motor carriage via a rotation shaft 87. The rotation joint also includes a small gear 88 that meshes with the large gear 86. The small gear 88 is driven via a motor shaft 90 by a gear motor 92 mounted within the motor carriage 50. The gear motor 92 is powered by the hydraulic pump 78 via a hydraulic line 94. The hydraulic pump 78 causes the gear motor 92 to rotate the motor shaft 90 which causes the small gear 88 to travel on and walk about the perimeter of the large gear 86. The travel of the small gear 88 on the large gear 86 causes the motor carriage 50 to rotate with respect to the large gear 86 and the skyline coupler 46.

In the preferred embodiment, the hydraulic pump 78 is a pressure-sensitive pump, such as the Eaton pump referred to above, in order to maintain constant pressure on the logs 67 by the jaws 64, 66 of the grapple 54. The Eaton hydraulic pump is structured to sense the pressure exerted by the grapple jaws 64, 66 and automatically increase the pressure exerted by the grapple jaws in response to sensing a reduction in pressure. For example, if one of the logs in the grapple 54 slipped out, the grapple jaws 64, 66 would tend to close further which would extend the grapple hydraulic cylinders 72, 74. The extension of the grapple hydraulic cylinders 72, 74 results in a decrease in hydraulic pressure within the hydraulic cylinders which is sensed by a pressure sensor within the hydraulic pump 78. The pressure sensor opens a valve in the hydraulic pump 78 which causes the hydraulic pump to force more hydraulic fluid into the grapple hydraulic cylinders 72, 74 via the hydraulic lines 70. The hydraulic pump 78 continues to force hydraulic fluid into the grapple hydraulic cylinders 72, 74 until the pressure on the logs 67 by the grapple jaws 64, 66 returns to the level existing before the log slipped out of the grapple 54.

In an alternative embodiment, a separate pressure-sensitive switch can be incorporated into the hydraulic lines 70 to sense the hydraulic pressure in the hydraulic lines. Such a separate pressure-sensitive switch could be coupled to the throttle of the engine 76 such that the throttle is opened automatically in response to a reduction in the hydraulic pressure within the hydraulic lines 70. Opening the throttle in the engine 76 which causes the engine to increase power to the hydraulic pump 78 which causes the hydraulic pump to increase the hydraulic pressure in the hydraulic line 70.

In the preferred embodiment, the grapple carriage 32 includes a radio transceiver 98 coupled to the engine 76 and the hydraulic pump 78. The radio transceiver is responsive to a radio controller operated by the user in order to control the operations of the engine 76 and hydraulic pump 78. For example, the transceiver 98 is coupled to start the engine 76 and control its throttle. In addition, the transceiver 98 is coupled to the hydraulic pump 78 in a manner that enables the user to selectively control the movement of the motor carriage 50 with respect to the skyline coupler 46, the boom 56 with respect to the motor carriage 50, and the grapple 54 with respect to the boom 56. Such a transceiver 98 and the radio controller can be purchased from Maki Manufacturing Incorporated. In addition, similar transceivers and radio controllers are well known in the art.

Figure 5:
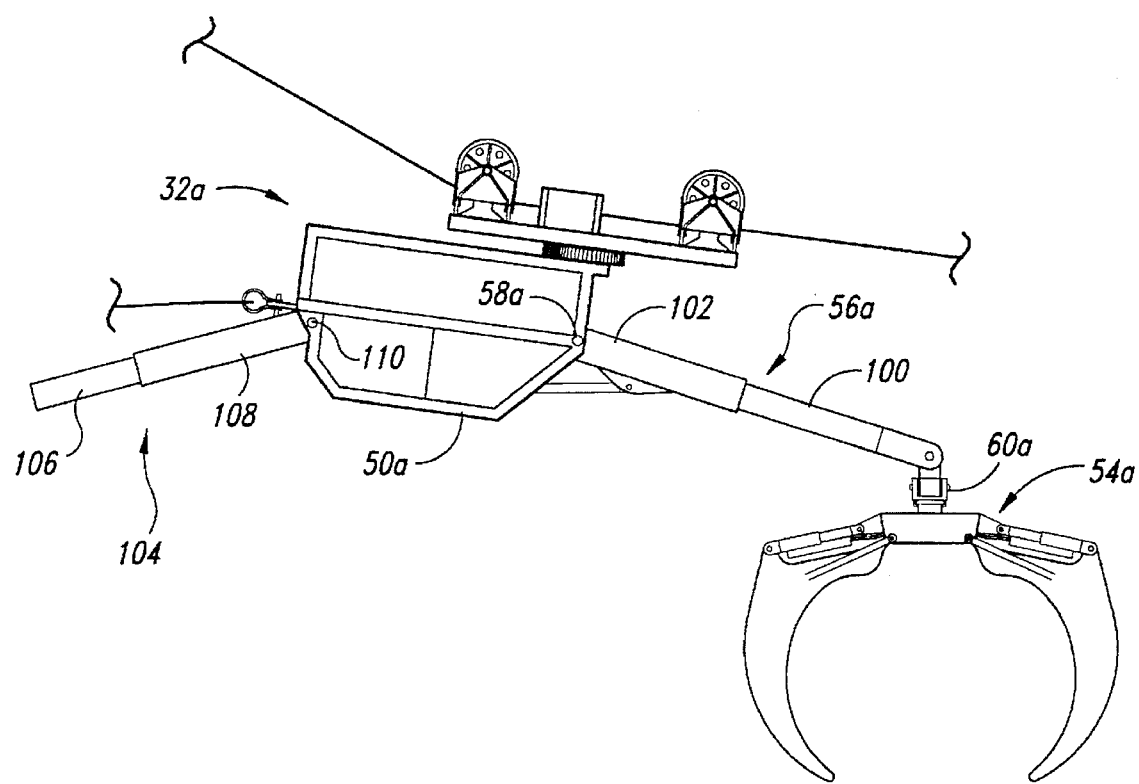
FIG. 5 is a side elevational view of an alternate grapple carriage according to the present invention.

Shown in FIG. 5 is an alternate grapple carriage 32a according to the present invention. Many of the elements of the grapple carriage 32a shown in FIG. 5 are identical to corresponding elements in the grapple carriage 32 shown in FIGS. 2–4, and thus, a discussion of those identical elements is omitted here for brevity. The grapple carriage 32a differs from the grapple carriage 32 in that the grapple carriage 32a includes an extendible boom 56a coupling a grapple 54a to a motor carriage 50a. The extendible boom 56a includes a first arm member 100 that is coaxially aligned with and extends into a second arm member 102. Preferably, the extendible boom 56a includes a hydraulic cylinder (not shown) coupled to a hydraulic pump (not shown in FIG. 5) that causes the first arm member 100 to move into and out of the second arm member 102 telescopically as needed to extend or retract the extendible boom 56a. In the embodiment shown in FIG. 5, the grapple 54a is pivotally and rotatably coupled to the first arm member 100, and the second arm member 102 is pivotally coupled to the motor carriage 50a. However, it will be appreciated that the extendible boom 56a could be structured and coupled in numerous ways in order to increase the reach of the grapple 54a.

The alternate grapple carriage 32a also includes an extendible counterweight 104 coupled to an opposite side of the motor carriage 50a with respect to the extendible boom 56a. The extendible counterweight 104 includes a first counterweight arm member 106 coaxially aligned with and extending into a second counterweight arm member 108 coupled to the motor carriage 50a. The second arm member 108 is pivotally coupled to the motor carriage 50a by a pivot pin 110 extending through the motor carriage 50a and the second counterweight arm member 108. Preferably, the counterweight 104 is coupled to the hydraulic pump in substantially the same manner as the extendible boom 56a is coupled to the hydraulic pump to operate simultaneously. As a result, whenever the extendible boom 56a is extended, the extendible counterweight 104 is similarly extended in an opposite direction in order to counterbalance the weight of the extendible boom 56a and the grapple 54a. Similarly, when the extendible boom 56a retracts, the extendible counterweight 104 retracts. Furthermore, when the extendible boom 56a pivots upwardly or downwardly, the extendible counterweight 104 pivots in a similar manner to counterbalance the extendible boom. Because the extendible counterweight 104 does not include a grapple or a grapple joint, the extendible counterweight 104 preferably is heavier than the extendible boom 56a to properly balance the grapple carriage 32a. Alternatively, numerous other structures and methods could be employed to counterbalance the weight of the extendible boom 56a and the grapple 54a.

Based on foregoing discussion, it will be appreciated that the grapple carriage of the present invention enables a much safer and more efficient skyline carriage for picking up and transporting logs along a skyline cable. The grapple carriage is much safer because it can pick up logs without any assistance from a logger at the logs. In addition, the grapple carriage is much more maneuverable than prior art skyline carriages which allows logs to be picked up and transported much faster than prior art systems. In particular, the maneuverability of the grapple carriage enables the grapple of the grapple carriage to reach logs positioned to either side of the skyline cable as well as directly underneath the skyline cable.

It should be understood that even though numerous advantages of the present invention have been set forth in the foregoing description, the above disclosure is illustrative only. Changes may be made in detail and yet remain within the broad principles of the present invention.

I claim:

1. A grapple carriage for picking up and transporting logs along a path of a skyline cable, comprising:
    a skyline coupler coupled to the skyline cable to move along the skyline cable path;
    a grapple structured to grasp the logs;
    a carriage supporting the grapple, the carriage being rotatably coupled by a rotation joint to the skyline coupler to position the grapple at a selected position laterally spaced from the skyline cable, wherein the carriage includes an engine that provides power sufficient to rotate the carriage about the rotation joint with respect to the skyline coupler, the engine being spaced laterally in a first direction from a generally vertical first plane extending through the rotation joint; and
    a boom extending from the carriage in a second direction opposite to the first direction such that the engine acts as a counterweight for the boom, the boom having a distal end coupled to the grapple and a proximal end pivotally coupled to the carriage for pivotal movement of the boom distal end in a generally second plane with respect to the carriage.

2. The grapple carriage of claim 1 wherein the grapple is pivotally coupled to the boom distal end.

3. The grapple carriage of claim 2 wherein the grapple is rotatably coupled to the boom distal end.

4. The grapple carriage of claim 1 wherein the boom includes first and second arm members coaxially aligned with respect to each other, the first arm member extending telescopically into and out of the second arm member to enable the boom to be extended and retracted.

5. The grapple carriage of claim 4 wherein the carriage has first and second ends, and the boom extends from the first end of the carriage, the grapple carriage further including an extendible counterweight coupled to the second end of the carriage, the counterweight having first and second arm members coaxially aligned with respect to each other, the first counterweight arm member being movable into and out of the second counterweight arm member to enable the counterweight to be extended and retracted, the counterweight being operable to cause the counterweight to extend when the boom extends in order to counter the weight of the boom.

6. The grapple carriage of claim 1 wherein the skyline coupler is movably coupled to the skyline cable in a manner that enables the skyline coupler to travel along the skyline cable.

7. The grapple carriage of claim 1 wherein the grapple includes a mouth structured to exert pressure to grasp the logs, the grapple carriage further comprising a pressure sensitive grapple controller coupled to the grapple, the grapple controller being structured to sense the pressure exerted by the grapple mouth and automatically increase the pressure exerted by the grapple mouth in response to sensing a reduction in the pressure exerted by the grapple mouth.

8. A grapple carriage for picking up and transporting logs along a path of a skyline cable, comprising:
    a carriage coupled to the skyline cable to move along the skyline cable path;
    a boom extending longitudinally from a proximal end to a distal end, the proximal end being pivotally coupled to the carriage such that the boom pivots about a first axis transverse to a longitudinal axis of the boom; and
    a grapple pivotally coupled to the distal end of the boom such that the grapple pivots about a second axis transverse to the longitudinal axis of the boom, the grapple being structured to grasp the logs.

9. The grapple carriage of claim 8, further comprising a skyline coupler coupled to the skyline, the carriage being rotatably coupled to the skyline coupler in a manner that enables the distal end of the boom and the grapple to be positioned laterally of the skyline cable.

10. The grapple carriage of claim 9 wherein the skyline coupler is movably coupled to the skyline cable in a manner that enables the skyline coupler to travel along the skyline cable.

11. The grapple carriage of claim 8 wherein the grapple is rotatably coupled to the boom distal end.

12. The grapple carriage of claim 8 wherein the boom includes first and second arm members slidably coupled to each other, the first arm member sliding on the second arm member toward and away from the carriage to enable the boom to be retracted and extended.

13. The grapple carriage of claim 12, further comprising an extendible counterweight positioned on a side of the carriage opposite to the boom, the counterweight being structured to extend outwardly from the carriage in a direction away from the boom in order to counterbalance the boom.

14. The grapple carriage of claim 8 wherein the grapple includes a mouth structured to exert pressure to grasp the logs, the grapple carriage further comprising a pressure sensitive grapple controller coupled to the grapple, the grapple controller being structured to sense the pressure exerted by the grapple mouth and automatically increase the pressure exerted by the grapple mouth in response to sensing a reduction in the pressure exerted by the grapple mouth.

15. The grapple carriage of claim 8 wherein the carriage is coupled by a joint to a skyline coupler that is coupled to the skyline cable, the carriage including an engine that provides power sufficient to pivot the boom, the engine being spaced laterally in a first direction from a vertical plane extending through the joint, and wherein the boom extends from the carriage in a second direction substantially opposite to the first direction such that the engine acts as a counterweight for the boom.

16. A grapple carriage for picking up and transporting logs along a path of a skyline cable, comprising:
    a carriage coupled to the skyline cable to move along the skyline cable path;
    a boom position on a first side of the carriage and extending laterally from the carriage, the boom having a proximal end coupled to the carriage and a distal end laterally spaced from the skyline cable, wherein the boom includes first and second arm members axially aligned with respect to each other, the first arm member extending telescopically into and out of the second arm member to enable the boom to be extended and retracted;

an extendible counterweight positioned generally opposite to the boom on a second side of the carriage opposite to the first side, the counterweight having first and second arm members axially aligned with respect to each other, the first counterweight arm member being movable telescopically into and out of the second counterweight arm member to enable the counterweight to be extended and retracted, the counterweight being operable to extend when the boom extends in order to counterbalance the boom; and a grapple coupled to the distal end of the boom such that the grapple is laterally spaced from the skyline cable, the grapple being structured to grasp the logs.

17. The grapple carriage of claim 16 wherein the proximal end of the boom is pivotally coupled to the carriage such that the distal end of the boom and the grapple pivot as a unit with respect to the carriage.

18. The grapple carriage of claim 16, further comprising a skyline coupler coupled to the skyline cable, the carriage being rotatably coupled to the skyline coupler in a manner to allow selective positioning of the distal end of the boom and the grapple in a selected position laterally spaced from the skyline cable.

19. The grapple carriage of claim 16 wherein the skyline coupler is movably coupled to the skyline cable in a manner that enables the skyline coupler to travel along the skyline cable.

20. The grapple carriage of claim 16 wherein the grapple is pivotally coupled to the boom distal end.

21. The grapple carriage of claim 20 wherein the grapple is rotatably coupled to the boom distal end.

22. The grapple carriage of claim 16 wherein the grapple includes a mouth structured to exert pressure to grasp the logs, the grapple carriage further comprising a pressure sensitive grapple controller coupled to the grapple, the grapple controller being structured to sense the pressure exerted by the grapple mouth and automatically increase the pressure exerted by the grapple mouth in response to sensing a reduction in the pressure exerted by the grapple mouth.

23. The grapple carriage of claim 16 wherein the carriage is coupled by a joint to a skyline coupler that is coupled to the skyline cable, the carriage including an engine that provides power sufficient to pivot the boom, the engine being spaced laterally in a first direction from a vertical plane extending through the joint, and wherein the boom extends from the carriage in a second direction substantially opposite to the first direction such that the engine acts as a counterweight for the boom.

* * * * *